Dec. 29, 1936.  A. F. HOESEL  2,065,586
METHOD AND MACHINE FOR MAKING FINNED TUBE HEAT EXCHANGERS
Filed Feb. 8, 1934  7 Sheets-Sheet 1

INVENTOR
Anthony F. Hoesel

Dec. 29, 1936.  A. F. HOESEL  2,065,586
METHOD AND MACHINE FOR MAKING FINNED TUBE HEAT EXCHANGERS
Filed Feb. 8, 1934  7 Sheets-Sheet 2

Fig. 5.

Inventor:
Anthony F. Hoesel

Dec. 29, 1936.  A. F. HOESEL  2,065,586
METHOD AND MACHINE FOR MAKING FINNED TUBE HEAT EXCHANGERS
Filed Feb. 8, 1934   7 Sheets-Sheet 7

Patented Dec. 29, 1936

2,065,586

UNITED STATES PATENT OFFICE 2,065,586

METHOD AND MACHINE FOR MAKING FINNED TUBE HEAT EXCHANGERS

Anthony F. Hoesel, Chicago, Ill., assignor to Peerless Ice Machine Company, Chicago, Ill., a corporation Application February 8, 1934, Serial No. 710,262

24 Claims. (Cl. 29—84)

The present invention relates to a machine for the economical assembly of spaced fins upon tubing, whereby the heat transfer surface of the tube is greatly increased. More specifically this application relates to a machine for the commercial manufacture of finned tubing heat exchangers as disclosed in my pending application Serial Number 591,086, filed February 5, 1932.

Heretofore, the manufacture of finned tubing was accomplished by a large amount of manual labor in the spacing of the fins upon the tubing, each fin having to be handled separately when placing the same in the spacing jig. There also existed a practical limit as to the length of tubing which could be handled in this manner since the tubing, generally, was pushed through the hole in the jig spaced fins.

The objects of my invention are to provide a machine whereby the fins are automatically spaced and affixed to the tubing, also to automatically provide for alternate finned and non-finned portions of tube, the non-finned portions serving to make the return bends by means of which the tubing can be nested, thereby eliminating soldered return bends.

Figure 6 is an elevational view of Figure 5a.

Figure 23 is a view of the tube moving clamp.

Figures 1, 2:
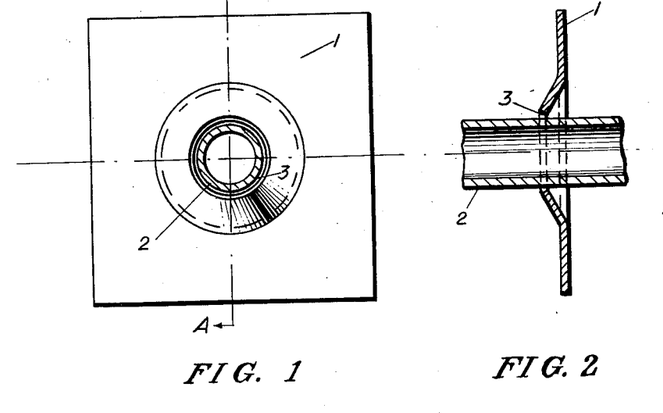
Figure 1 is an end view of a fin upon the tubing prior to its being affixed thereto.
Figure 2 is a sectional view along line A—A, Figure 1.

Referring to Figures 1 and 2, fin I, placed upon tube 2, has a central hole 3, which, punched while the stock is flat and to a diameter somewhat smaller than the diameter of tube 2, is then increased in diameter by dishing the material adjacent the hole 3 and as indicated so as to then be a very loose fit between hole 3 and tube 2.

Figure 3:
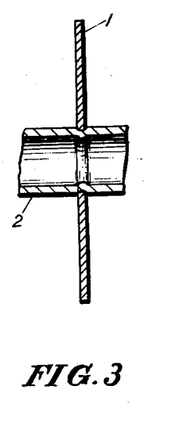
Figure 3 is a sectional view of the fin and tube after the affixing operation.

Figure 3 indicates the fin I affixed to tube 2 by means of straightening out the dished portion, which tends to force the hole 3 to closely assume its original diameter and firmly clamp fin I to tube 2.

Figure 4:
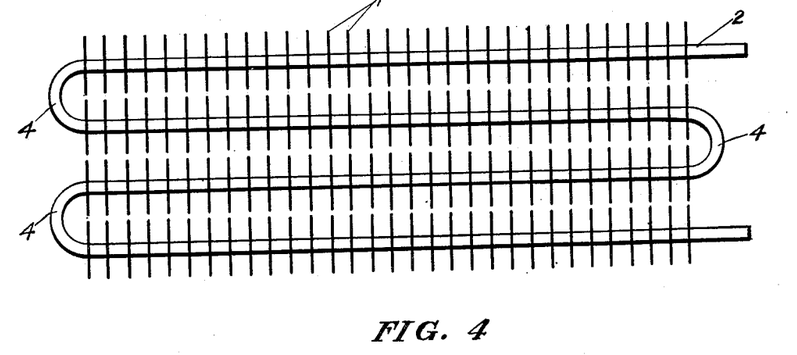
Figure 4 is a view of a tubing with alternate finned and non-finned portions after bending the non-finned portions.

In Figure 4, continuous tube 2 is made into nested form as shown by making return bends of the non-finned portions 4.

Figure 5:
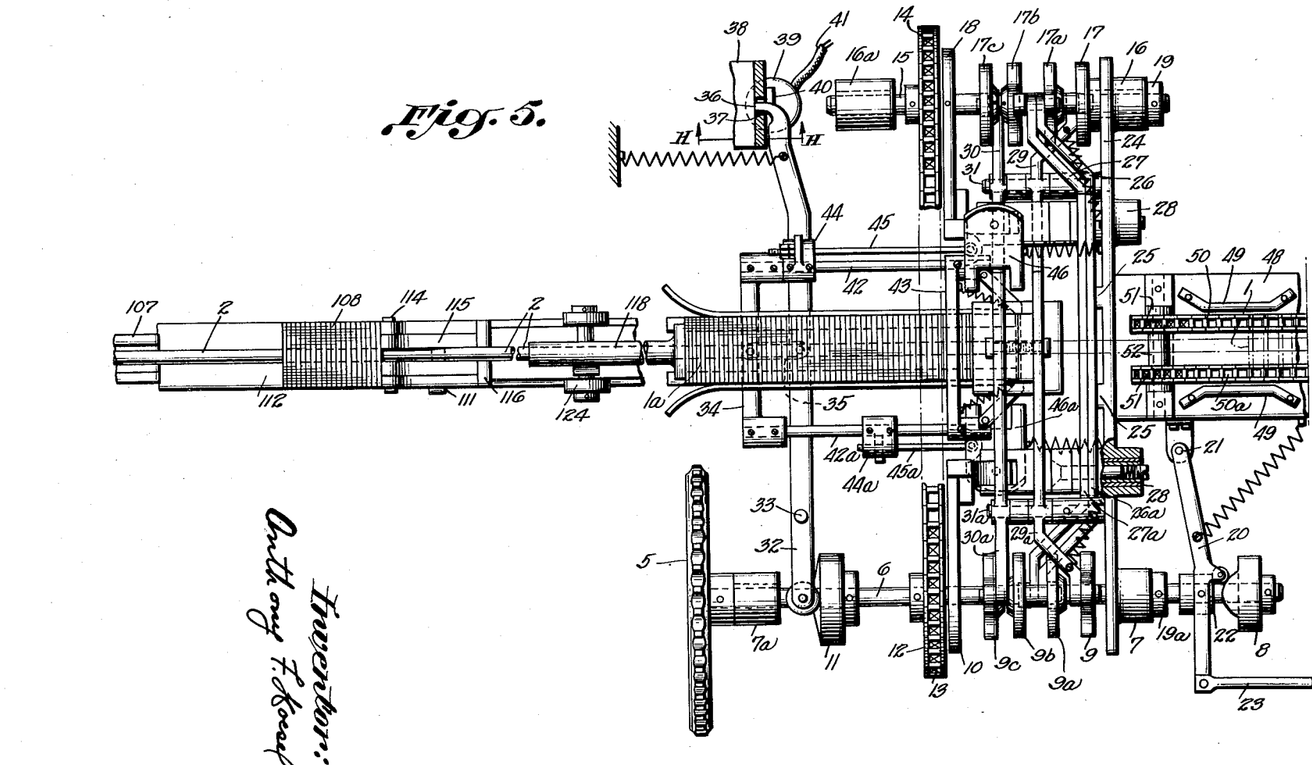
Figure 5 is a plan view, somewhat diagrammatic, of the fin separator, fin feeder, and fin affixing portion of the machine.

In Figure 5, tube 2 passes through a primary stack of free fins Ia; the upper portion of tube 2 has fins I, which have been spaced and affixed to the tube 2 during its passage through the machine. Sprocket 5 fastened to shaft 6 and connected to any suitable source of power serves to drive the machine. Bearings 7 and 7a serve as supports for shaft 6 upon which are fastened cams 8, 9, 9a, 9b, 9c, 10 and 11. Sprocket 12 is fastened to shaft 6 and by means of chain 13 drives sprocket 14 fastened to shaft 15, which, supported in bearings 16 and 16a has fastened cams 17, 17a, 17b, 17c, and 18. Thrust collars 19 and 19a fastened to shafts 15 and 6 resist the thrust of cams 18 and 10 respectively.

Lever 20 fulcrumed at 21 and supported by bushing 22, which is a free fit on shaft 6, operates pull rod 23. The vertical portion of the machine frame 24 has two projecting surfaces 25, which provide a backing means for anvils 26 and 26a which are oscillated by cams 17a and 9a respectively. Anvils 27 and 27a are oscillated by cams 17b and 9b and reciprocated by cams 18 and 10 respectively. The anvils 26, 26a, 27, and 27a, are pivoted in bearings 28.

The lever arms 29 and 30 pivoted on shaft 31 are oscillated by cams 17 and 17c respectively. The lever arms 29a and 30a pivoted on shaft 31a are oscillated by cams 9 and 9c respectively.

Lever 32, pivoted at 33, operated by cam 11, and connected to feeder end frame 34 with link 60

35, has a right angled stub 36, which moves in and out of hole 37 in abutment 38 which is part of the machine frame.

Figures 6, 23:
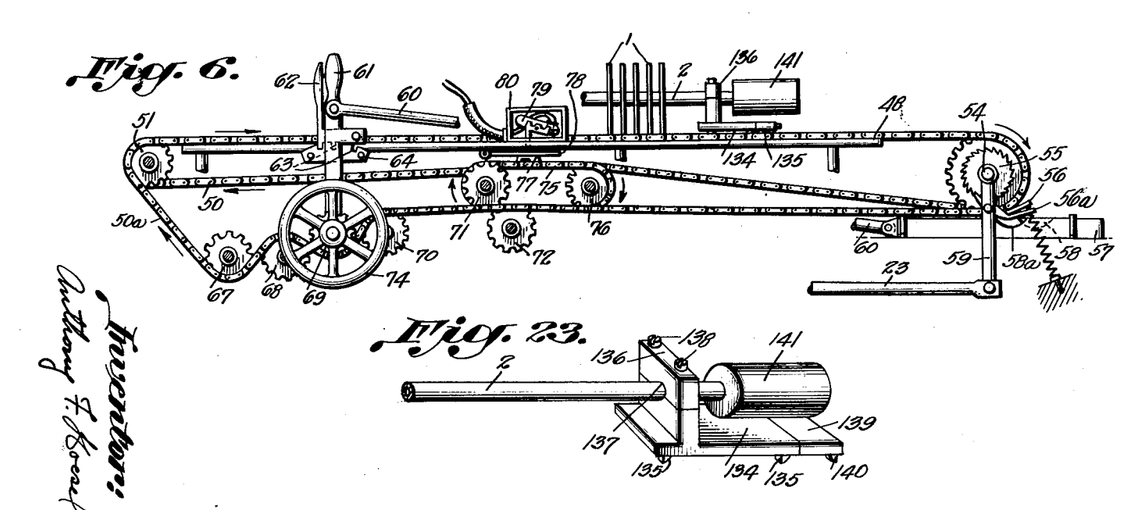
Figure 7:
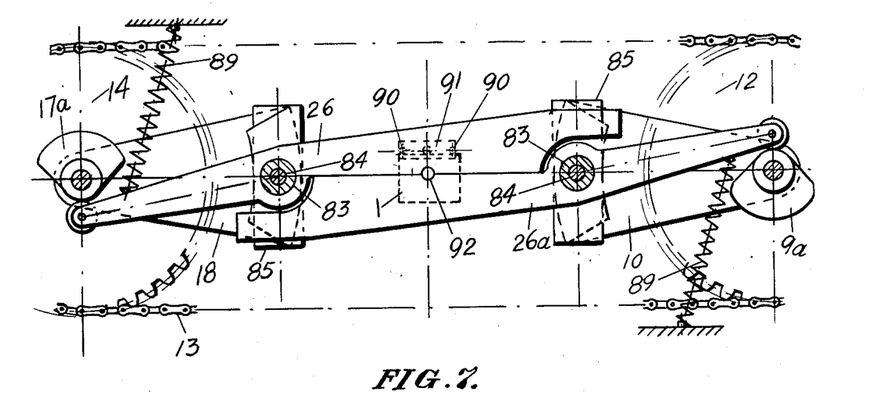
Figure 7 is an elevational view of the fin affixing means in the closed position and along line G—G, Figure 8.

Solenoid 39 fastened to the machine frame operates lever travel limit 40 to cover and uncover hole 37 in response to electrical current through circuit leads 41 connected to timing means shown in Figures 6 and 7.

Rods 42 and 42a connect feeder end frame 34 with feeder fingers carrier 43 and have fastened arm extensions 44 and 44a to operate pull rods 45 and 45a connected to timing locks 46 and 46a respectively.

The channel support 47 supports the fin stack 1a and tubing 2 in exact vertical and horizontal alignment.

Chain table 48 with side guides 49 serves as a support for the tube pull chains 50 and 50a which are mounted upon sprockets 51 revolving on shaft 52.

The various springs shown are for the purpose of keeping the levers in contact with their respective cams.

Figure 5A:
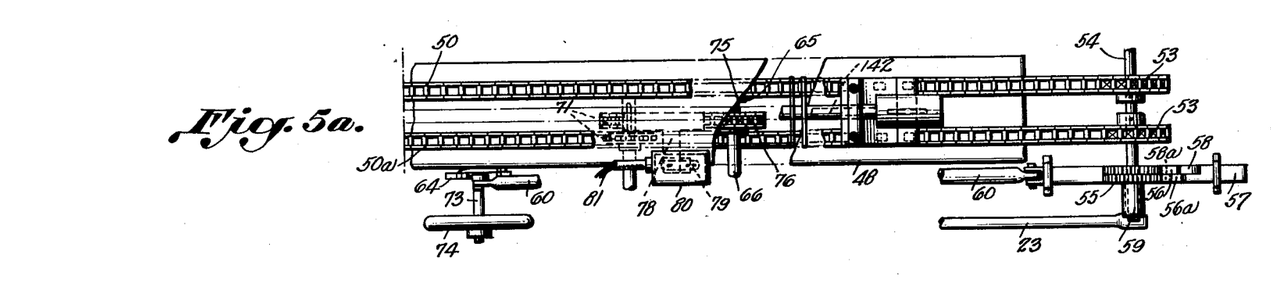
Figure 5a is a plan view, somewhat diagrammatic, of the fin spacing, tube moving means, also the timing means providing for the alternate finned and non-finned portions of the tube.

Referring to Figures 5a and 6, the upper portions of chains 50 and 50a lie on table 48 and engage sprockets 51 at one end. The other end of chains 50 and 50a engage sprockets 53 fastened to shaft 54 to which also is fastened multiple ratchet 55. Pawl lever 59 oscillating about shaft 54 by means of pull rod 23 carries pawls 56 and 56a engaging with their respective portions of multiple ratchet 55 whenever the pawl selector bar 57 is moved to register groove 58 or 58a with the bottom end of the respective pawl. The two sections of ratchet 55 have a different number of teeth. The pawl selector bar 57 is connected to rod 60, which in turn is connected to shifting handle 61 carrying lock 62 engaging with slots 63 in index plate 64. The bottom portion of chain 50 lies on idler sprocket 65 revolving on shaft 66. The bottom portion of chain 50a engages sprockets 67, 68, 69, 70, 71, and 72. Sprocket 69 fastened to shaft 73 to which is also fastened handwheel 74 serves as a manual means for moving chains 50 and 50a back and forth. Sprocket 71 is made in multiple, one portion of which engages chain 50a and the other portion of which carries one end of timing chain 75, which at its other end is carried by idler sprocket 76 revolving about shaft 66, which is shiftably mounted to allow for timing chains 75 of various lengths.

The timing chain 75 carries a cam 77, which for each revolution of the timing chain 75, engages rocker arm 78 which operates mercury tube switch 79 contained in housing 80. Circuit leads 81 connect to solenoid 39, Figure 5, and also to a suitable source of electric current.

Figure 8:
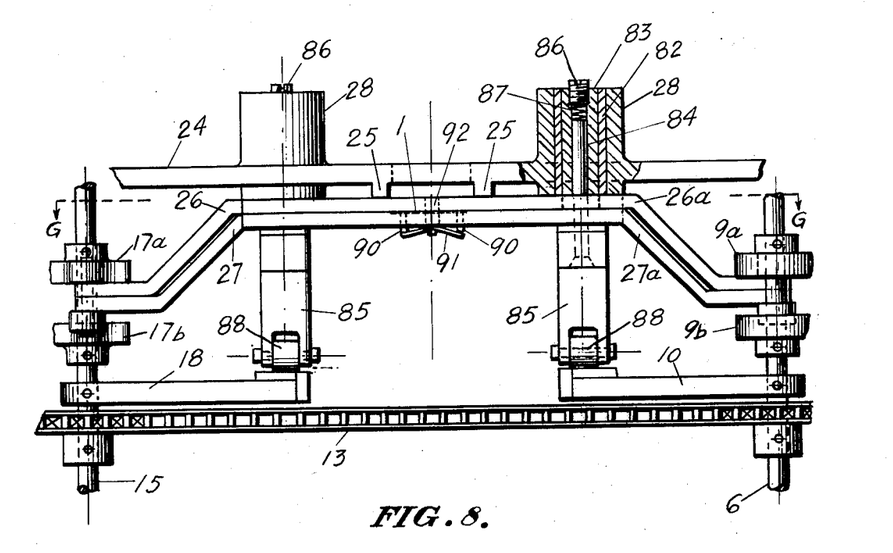
Figure 8 is a plan view of the fin affixing means in the closed position.

Referring to Figures 7 and 8, bushings 82 pressed into bearing hubs 28 provide bearings for hollow shafts 83 integral with anvils 26 and 26a. Anvils 27 and 27a have solid shafts 84, carrying cam roller holders 85 which extend beyond anvils 27 and 27a so as to engage their opposite ends whenever anvils 27 and 27a are in their closed position as shown. Plugs 86 screwed into hollow shafts 83 serve as retainers for springs 87, one end of which bears against solid shafts 84, thereby tending to keep the anvils 27 and 27a separated from anvils 26 and 26a until such time as cams 10 and 18 engage the rollers 88 of the cam roller holders 85, at which time anvils 27 and 27a are forced to their closed position against the pressure of springs 87.

Springs 89 serve to keep the roller ends of the anvils 26, 26a, 27, and 27a, in contact with their respective cams.

Pins 90, held by flat spring 91 secured to anvil 27, play in holes so positioned in anvil 27, that fin 1 is held in exact edgewise alignment whenever the anvils are in their closed position. The bore 92 is of a slightly larger diameter than that of tube 2, which is positioned therein.

Figures 9, 11, 12:
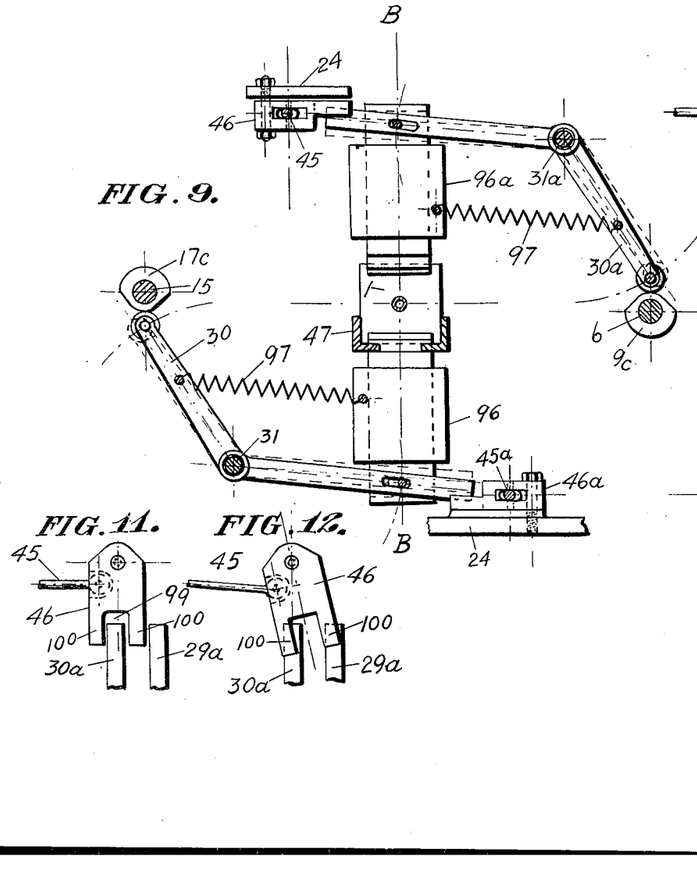
Figure 9 is an elevational view of the fin separator means.
Figure 11 is a plan view of the timing locks in their unlocked position.
Figure 12 is a plan view of the timing locks in their locked position.
Figure 10:
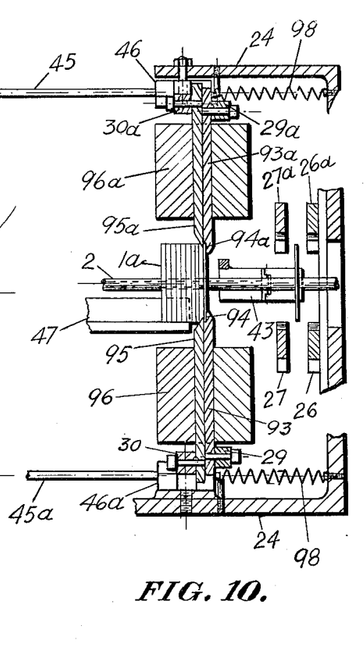
Figure 10 is a vertical section on line B—B, Figure 9.

In Figures 9 and 10, lever arms 29 and 29a, pivoted on shafts 31 and 31a, connect to abutment blocks 93 and 93a respectively. The abutment blocks are undercut as at 94 and practically equal to the thickness of the material of fins 1. Lever arms 30 and 30a, pivoted on shafts 31 and 31a, connect to fin separator knives 95 and 95a respectively. The abutment block 93 and separator knife 95 work in a guide portion 96 of frame 24. The abutment block 93a and separator knife 95a work in a guide portion 96a of frame 24. Springs 97 serve to keep the roller ends of levers 29, 29a, 30, and 30a, in contact with their respective cams. Springs 98 tend to keep timing locks 46 and 46a in their locking position.

In Figure 11, timing lock 46, connected to pull rod 45, is shown in its unlocked position, whereby slot 99 provides a space in which the end of lever 30a can move unrestrained.

In Figure 12, timing lock 46 is shown in its locked position, whereby extensions 100 prevent the full travel of the levers 29a and 30a.

Timing lock 46a operates simultaneously and in the same manner as timing lock 46.

Figures 13, 14:
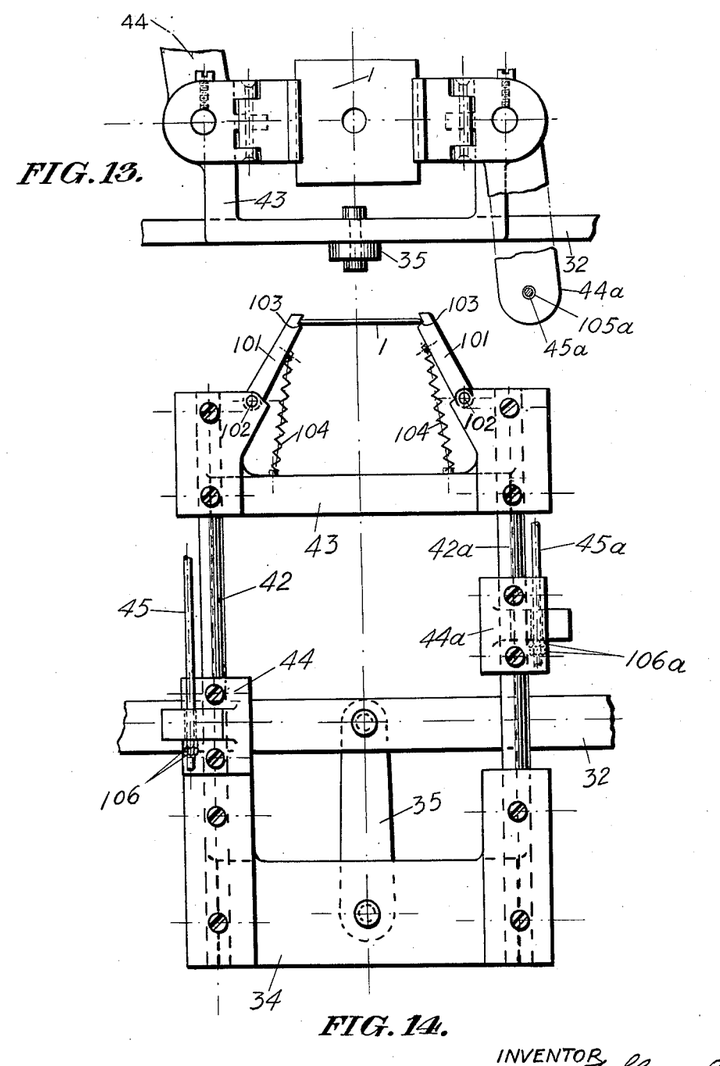
Figure 13 is an elevational view of the fin feeder with the timing locks operating arms.
Figure 14 is a plan view of Figure 13.

Referring to Figures 13 and 14, Figure 14 is a plan view of the fin feeder assembly comprising an end frame 34 connected to lever 32 with link 35. Rods 42 and 42a provide an extension connection between end frame 34 and feeder fingers carrier 43 to both of which they are fastened. The feeder fingers carrier 43 has fingers 101 pivoted at 102. The fingers 101, at their free end, have an undercut 103 which serves as an abutment for fin 1 during its movement by the feeder assembly. Springs 104 tend to keep fingers 101 in contact with fin 1. Mounted upon rods 42 and 42a are arm extensions 44 and 44a, which at their opposite ends have holes 105 and 105a, which are a free fit for pull rods 45 and 45a, which are threaded and have abutment lock nuts 106 and 106a at one end. The other ends of pull rods 45 and 45a are connected to timing locks 46 and 46a respectively, see Figures 5, 9, and 10. The fin feeder assembly reciprocates in suitable guides, not shown, which are integral with or fastened to the machine frame 24.

Figures 15, 16, 17, 18, 19, 20, 21, 22:
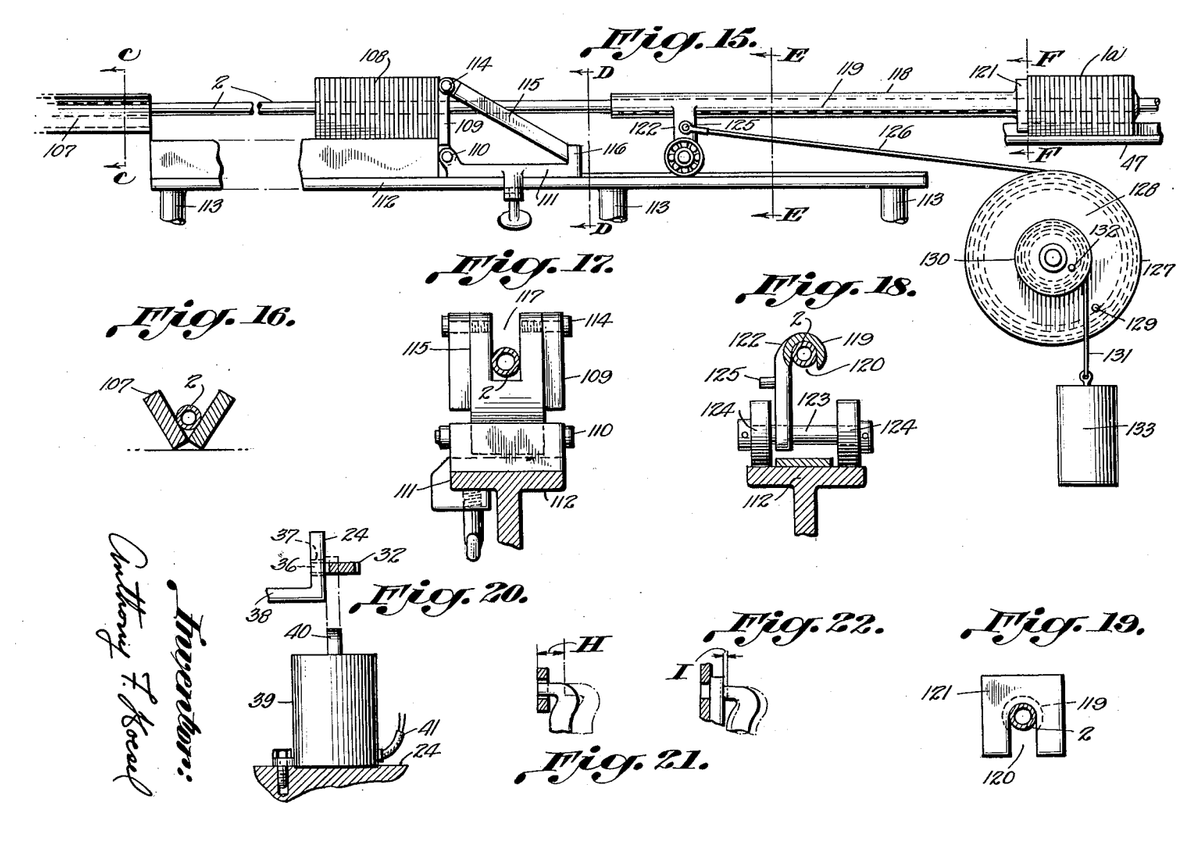
Figure 15 is a longitudinal view of the fin stacks, tube support, and stack pusher.
Figure 16 is a section along line C—C, Figure 15.
Figure 17 is a section along line D—D, Figure 15.
Figure 18 is a section along line E—E, Figure 15.
Figure 19 is a section along line F—F, Figure 15.
Figure 20 is an elevational view of the solenoid timing means along line H—H, Figure 5.
Figures 21 and 22 show additional details of the solenoid timing means illustrated in Fig. 20.

Referring to Figure 15, tube 2 at its left hand side lies in a suitable trough support 107, the right hand side of tube 2 lies in the holes of the fins in primary free fin stack 1a, supported by the channel support 47, intermediate the two supports is the secondary free fin stack 108 held against movement by a manually collapsible abutment 109 pivoted at 110 to a clamp member 111 engaging table means 112 with support legs 113.

The other end of the collapsible abutment is pivoted at 114 to a strut member 115 which engages the clamp member 111 at the point 116. Slot 117 in both the abutment 109 and the strut member 115 allows both these members to be straightened horizontally without interfering with tube 2. Intermediate both fin stacks 1a and 108 and partially encircling tube 2 is the stack pusher 118 comprising a tube 119 with a bore and longitudinal slot 120, in excess of the diameter of tube 2. One end of the tube 119 has a pusher plate 121, which engages the end of the primary free fin stack 1a. The slot 120 also passes through the pusher plate 121. The left hand side of tube 119 has a roller support 122 with a shaft 123 upon which are mounted roller bearings 124 rolling along the top of the table means 112. The roller support 122 has a pin 125 to which is fastened cable 126, which operates in a single width groove 127 of double groove sheave 128. The cable 126 is fastened to the sheave 128 as indicated at 129. The other single width groove 130 of sheave 128 carries a cable 131 one end of which is fastened to sheave 128 as indicated at 132 and the other end of which is fastened to a weight 133.

Referring to Figure 20, which is an elevational view of the solenoid timing means along line H—H, Figure 5, lever 32 has a projecting stub 36, which is of smaller diameter than hole 37 in the frame 24. Solenoid 39 fastened to the machine frame 24 operates a lever travel limit 40 to cover and uncover hole 37 in response to electrical current through circuit leads 41 connected to timing means shown in Figures 5a and 6. The ordinary travel of stub 36 is indicated by H. Whenever the mercury tube switch 79, Figures 5a and 6, is in the on position, the lever travel limit raises to the position indicated by the dotted lines and provides a travel of the stub end 36 as indicated by I.

Referring to Figure 23, the clamp body 134 has four lugs 135 which engage pull chains 50 and 50a as shown in Figure 6 and 7. The clamp body 134 and its associated cap 136 have a bore 137 which clamps tube 2 whenever screws 138 are tightened. The take up block 139 has two lugs 140, which face in the opposite direction to that of lugs 135 on clamp body 134, their relative distances apart are such that, when forced into the chains 50 and 50a, the clamp body 134 is rigidly held in place. Weight 141 has a stem 142, which is a loose fit in the bore of tube 2.

Having described the component parts of the machine, I shall now describe its operation.

Referring to Figures 5 and 15, a multitude of punched fins are placed in stacked relationship as indicated at 1a and 108. Through the center hole of the fins a suitable tube 2 projects through the machine proper and is engaged at its end by the tube moving clamp 136. The other end of the tubing lies in the trough 107, which prevents kinking of the tubing and since all of the elements are in line, the tube is free to move upon a movement of the tube moving clamp. The various mechanical movements are as follows: The cams 9 and 17 oscillate the lever arms 29 and 29a, which in turn oscillate the abutment blocks 93 and 93a toward the tubing 2 thereby decreasing the opening between the ends of the abutment blocks 93 and 93a below the width of the punched fins 1a, which are pressed toward the abutment blocks by the stack pusher 118, which has a force exerted upon itself by means of the weight 133 and its associated system of cables 126 and 131 and double groove sheave 128.

The abutment blocks 93 and 93a, after moving to the position mentioned above, have a pause period, during which the cams 9c and 17c oscillate the lever arms 30 and 30a, which in turn move the fin separator knives 95 and 95a toward the tube 2, thereby imprisoning a single fin in the undercut space 94 and 94a of the abutment blocks 93 and 93a. Due to the angle of the fin selector knives 95 and 95a, and their movement, the fin stack 1a is pushed back against the pressure of the stack pusher 118 a sufficient distance to allow the fingers 101 to engage the imprisoned fin with their undercuts 103 when the cam 11 moves the lever 32 and its associated fin feeder assembly, Figures 13 and 14, into position.

During the movement of the fin feeder assembly, Figures 13 and 14, in position to engage the separated fin, the abutment blocks 93 and 93a and the fin separator knives 95 and 95a have a pause period in the position shown in Figures 9 and 10. Immediately after the engagement of the fingers 101 with the separated fin, the abutment blocks 93 and 93a are moved away from the tube 2 thereby increasing the distance between them and allowing the fin feeder assembly to move the fin into position between the anvils 26, 26a, 27, and 27a, as shown in Figure 10.

During the movement of the fin, the anvils 26 and 26a assume their closed position shown in Figure 7. When the moved fin is in the position shown in Figure 10, the anvils 27 and 27a start closing and when they are closed sufficiently to prevent the return of the moved fin, the fin feeder assembly withdraws to its previous position. Since the top and bottom of the moved fin engages the anvils 27 and 27a respectively, the fingers 101 slip off the moved fin. The anvils 27 and 27a then assume their closed position, in which the pins 90 in anvil 27a definitely prevent any rotation of the fin and thereby ensure the edges of the fin being in alignment with prior affixed fins.

After the anvils 27 and 27a have assumed their closed position, the cams 10 and 18 then reciprocate the anvils 27 and 27a to the closed position shown in Figure 8, during which the dished portion of the fin is flattened and the fin grips the tube 2 as shown in Figures 2 and 3.

During the affixing of the moved fin, the fin separator means has separated another fin from the stack 1a and the fin feeder assembly has returned to its previous position.

After the fin is affixed to the tube, the cams 10 and 18 allow the anvils 27 and 27a to separate from the anvils 26 and 26a by means of the springs 87. During the separation, the anvils 26, 26a, 27, and 27a, assume their open position.

After the anvils reach their open position, the cam 8, Figure 5, with its associated system of lever 20, pull rod 23, pawl lever 59, pawl 56 or 56a, ratchet 55, shaft 54, and sprockets 53 moves the chains 50 and 50a with which the tube moving clamp, Figure 23, engages. The amount of the chain movement determines the spacing of the fins. Since the number of different spacings is rather limited, I have shown a system in Figures 5a and 6 whereby the spacing may be changed at will and with a minimum of delay. The pawl lever 59 has a definite angular movement and carries the pawls 56 and 56a through definite arcs. However by means of the shiftable pawl selector bar 57 with its grooves 58 and 58a associated with the ends of pawls 56 and 56a, which in turn are associated with the multiple ratchet 55, it is possible, by means of the indexed shifting handle 61 to make a quick change in the spacing of the fins by varying the increments of movement of the chains 50 and 50a.

The method of controlling the length of the recurrent finned portions of the tube 2 is as follows: As the chains 50 and 50a must move equal distances for equal finned and non-finned portions of the tube 2, the timing chain 75, moving in unison with the chains 50 and 50a, and carrying cam 77, is of a length equal to a finned and non-finned length. The cam 77 and rocker arm 78 are of such proportions that the mercury tube switch establishes an electrical circuit for a length of chain travel equivalent to the desired length of the non-finned portion of the tube 2; therefore the circuit is on for the non-finned length and the circuit is off for the finned length. Since the non-finned length necessary to form the return bends 4, Figure 4, is constant, it follows that any given variation in the length of the timing chain 75, will give an equivalent variation in the length of the finned portion of tube 2; therefore to get any definite length of the finned portion, it is only necessary to use a chain of a length equal to the desired length of the finned portion plus the length of the non-finned portion and the operation of the machine will result in continually recurrent on and off cycles of the electrical circuit in definite relation to the travel of the chains 50 and 50a.

The electrical circuit 81 of the mercury tube switch 79 and the circuit 41 of the solenoid 39, Figures 5 and 20, are placed in series with a suitable source of supply.

Whenever the mercury tube switch 79 is in the on position, the solenoid 39 is energized and the lever travel limit 40, Figures 5 and 20, rises sufficiently to cover the hole 37 in the machine frame 24, and vice versa.

During the finning operation, the solenoid being non-energized, the hole 37 being uncovered, and the lever 32 being allowed its full travel, the fin feeder assembly, Figures 13 and 14, also has a full travel.

Referring to Figures 5, 9, 10, 11, 12, 13, and 14, it will be noted that the fin feeder assembly carries extension arms 44 and 44a, which at their extreme ends have holes 105 and 105a, which are a loose fit for pull rods 45 and 45a, which, at the end associated with the arms 44 and 44a are provided with abutment lock nuts 106 and 106a, which allow the pull rods 45 and 45a to move with the fin feeder assembly. The opposite end of the pull rods 45 and 45a being connected to timing locks 46 and 46a, the timing locks move in unison with the fin feeder assembly. The timing locks 46 and 46a are of such shape that, whenever the fin feeder assembly has a full travel, the levers 29, 29a, 30, and 30a, and the associated abutment blocks 93 and 93a, and the fin separator knives 95 and 95a also have their full travel, each stroke of the various above-mentioned elements separating an individual fin from the stack 1a and moving it into the affixing position.

During the time that the solenoid 39 is energized, the lever travel limit 40 covers the hole 37 and the stub 36 of the lever 32 being denied entrance into the hole 37, the fin feeder assembly travel is limited. Due to the reduced travel of the pull rods 45 and 45a, the timing locks 46 and 46a remain in the position shown in Figure 12, thereby preventing springs 97, acting upon levers 29, 29a, 30, and 30a, opening the abutment blocks 93 and 93a, also the fin separator knives 95 and 95a. In the locked position as described above, the particular separated fin between the abutment blocks 93 and 93a and the fin separator knives 95 and 95a remains in this position and since the fin feeder assembly travel is limited, the fingers 101 do not engage the separated fin. All the movements of the other various parts occur as previously. Upon the breaking of the solenoid circuit the operations all proceed as before.

Due to various causes, there may be at times, a necessity to remove defectively placed fins from the tubing. This can be accomplished by moving the shifting handle 61, Figure 6, to its proper position, thereby disengaging pawls 56 and 56a from the ratchet 55. This allows the chains 50 and 50a to be moved by the hand wheel 74, bringing the defectively finned portion outside of the affixing portion of the machine, in which position the defective fins may be removed by cutting them off the tube. After the defective fins have been removed, the finned tubing is moved back to proper position, where the operation may again be resumed. Because the tube 2, chains 50 and 50a, and the timing chain 75 all move in unison, it is possible to remove any amount of defective fins, without affecting the lengths of the finned and non-finned portions, upon the resumption of the finning operation.

Referring to Figure 15, it will be noted that the force exerted by the stack pusher 118 varies with the length of the fin stack 1a, by means previously explained. The purpose of this variation is to compensate for variation in friction between the stack 1a and the channel support 47.

Referring to Figures 6 and 23, it will be noted that the tube moving clamp is shiftably mounted upon the chains 50 and 50a, thereby allowing a wide latitude in manual timing of the machine, especially when making very special coils.

While the above shows the preferred form of machine and method of affixing the fins to the tubing it is understood that there may be variations without departing from the spirit and scope of the invention.

What I claim is:

1. In a machine for fabricating finned tubing, the combination of means to space the fins upon the tubing and means affixing them thereto for a predetermined length and means making the spacing means inoperative for a predetermined length, both means being alternate in operation.

2. In a machine for fabricating finned tubing, the combination of means to stack a multitude of free fins upon the tubing, means to feed the tubing through the stacked fins and means to space the fins upon the tubing and means affixing them thereto for a predetermined length and means making the spacing means inoperative for a predetermined length, both last named means being alternate in operation.

3. In a machine for fabricating finned tubing, the combination of means to stack a multitude of free fins upon the tubing, means to feed the tubing through the stacked fins and means for withdrawing successive fins from the stack and spacing them upon the tubing and means affixing them thereto.

4. In a machine for fabricating finned tubing, the combination of means to stack a multitude of free fins upon the tubing, means to feed the tubing through the stacked fins and means for withdrawing successive fins from the stack and spacing them upon the tubing and means affixing them thereto for a predetermined length and means making the withdrawal means inoperative for a predetermined length, both last named means being alternate in operation.

5. In a machine for fabricating finned tubing, the combination of means to stack a multitude of free fins upon the tubing, means to feed the tubing through the stacked fins and means withdrawing successive fins from the stack and spacing them upon the tubing.

6. In a machine for making finned tubing, means to stack the fins freely upon the tubing, means to withdraw individual fins from the stack, means to affix the fins to the tubing, and the withdrawing means moving the fin to the point of the affixing operation.

7. In a machine for making finned tubing, means to stack the fins freely upon the tubing, means to withdraw individual fins from the stack, means to affix the fins to the tubing, and the withdrawing means moving the fin to the point of the affixing operation and means whereby the stack is kept in operative relationship with the withdrawal means irrespective of the stack size.

8. In a machine for making finned tubing, means to stack the fins freely upon the tubing, means to withdraw individual fins from the stack, means to affix the fins to the tubing, and the withdrawing means moving the fin to the point of the affixing operation and means whereby the stack is kept in operative relationship with the withdrawal means irrespective of the stack size, the said second last means exerting a force variable with the stack size.

9. In a machine for making finned tubing, means to space individual fins upon the tubing, movable anvil means to affix the spaced fin to the tubing, the last named means alternately approaching and receding from the tubing in timed relationship with the spacing means.

10. In a machine for making finned tubing with alternate finned portions and unfinned portions, timing means whereby the alternate portions are kept in their proper relationship the said timing means governing the feeding of the fins to the tube during its passage through the machine in which the fins are affixed to the tube.

11. In a machine for making finned tubing with alternate finned portions and unfinned portions, timing means whereby the alternate portions are kept in their proper relationship the said timing means governing the feeding of the fins to the tube during its passage through the machine in which the fins are affixed to the tube, the said timing means being adjustable for different lengths.

12. In a machine for making finned tubing with alternate finned portions and unfinned portions, timing means whereby the alternate portions are kept in their proper relationship the said timing means governing the feeding of the fins to the tube during its passage through the machine in which the fins are affixed to the tube, the said timing means being adjustable for different lengths, the adjustment varying only the length of the finned portions.

13. In a machine for making finned tubing, means to move the tubing, means to space individual fins upon the tubing, means to affix the fins upon the tubing, carrier means to prevent sliding friction against the affixed fins' edges during the movement, the said carrier means comprising a driven chain.

14. In a machine for making finned tubing, means to move the tubing, means to space individual fins upon the tubing, means to affix the fins upon the tubing, carrier means to prevent sliding friction against the affixed fins' edges during the movement, the said carrier means traveling at the same rate of speed as the tubing and comprising a driven chain.

15. In a machine for making finned tubing, anvil means, means to move the tubing past said anvil means for affixing the fins to the tubing, means to move the anvil means in and out of operative position and means providing a secondary movement to the anvil means when in position to affix the fin to the tubing.

16. In a machine for making finned tubing having substantially rectangular fins affixed thereto and with alternate finned and unfinned portions, means to move the tubing, means to space and affix the fins to the tubing and means to keep the spaced fins in edgewise alignment prior to the affixing operation.

17. In a machine for making finned tubing having substantially rectangular fins affixed thereto, the combination of anvil means for affixing the fins to the tubing, means to move the anvil means in and out of operative position and means associated with the anvil means, whereby when the anvil means is in operative position, the fin is kept in edgewise alignment with the previously affixed fins.

18. In a machine for making finned tubing, the combination of means to move the tube, a multitude of fins stacked freely upon the tube, separator means to separate individual consecutive fins from the end of the stack, means to move the separated fin to its affixing position, means to affix the separated fin to the tube, the last named means removing the separated fin from its moving means upon the return movement of the moving means.

19. In a machine for making finned tubing, the combination of means to move the tube, a stack of free fins upon the tube, means for spacing and affixing the fins to the tube, support means for the tube before and after the affixing operation and support means for the fin stack, the cooperation of the support means preventing binding of the tube in the fin stack.

20. In a machine for making finned tubing, the combination of means to move the tube, a stack of free fins upon the tube, means for spacing and affixing the fins to the tube, support means for the tube before the affixing operation, support means for the fin stack and support means for the finned tubing, the last named support means comprising a driven chain moving at the same rate of speed as the tubing.

21. In a machine for making finned tubing, the combination of means to space the fins, means to affix the fins to the tubing, primary means to move the tubing in timed relationship to the fin spacing means, means to operatively disconnect the primary moving means and manual means to move the tubing independent of the primary moving means.

22. In a machine for making finned tubing, primary means to move the tubing in one direction and in timed relationship with fin spacing means, manual means to move the tubing in two directions and independent of the primary moving means and the fin spacing means.

23. In a machine for making finned tubing, anvil means for fastening the fins to the tubing, resilient means to move the anvil means into operative position and cam means to move the anvil means out of operative position.

24. In a machine for making finned tubing, anvil means for fastening the fins to the tubing and comprising at least four sections, means to move the anvil means into and out of operative position, part of the anvil means being at one side of the fin being fastened and the remainder of the anvil means being at the opposite side of the fin.

ANTHONY F. HOESEL.